US010078634B2

(12) United States Patent
Gou et al.

(10) Patent No.: US 10,078,634 B2
(45) Date of Patent: Sep. 18, 2018

(54) VISUALIZING AND EXPLORING NATURAL-LANGUAGE TEXT

(71) Applicant: International Business Machines Corporation, Armonk, NY (US)

(72) Inventors: Liang Gou, San Jose, CA (US); Zhichao Hu, Scotts Valley, CA (US); Benny Kimelfeld, Technion (IL); Yunyao Li, San Jose, CA (US); Huahai Yang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 14/984,883

(22) Filed: Dec. 30, 2015

(65) Prior Publication Data
US 2017/0192962 A1 Jul. 6, 2017

(51) Int. Cl.
| G06F 17/27 | (2006.01) |
|---|---|
| G06F 17/21 | (2006.01) |
| G06F 17/28 | (2006.01) |
| G06F 17/24 | (2006.01) |
| G06F 3/0484 | (2013.01) |
| G06T 11/20 | (2006.01) |

(52) U.S. Cl.
CPC ......... *G06F 17/28* (2013.01); *G06F 3/04847* (2013.01); *G06F 17/211* (2013.01); *G06F 17/24* (2013.01); *G06F 17/2705* (2013.01); *G06F 17/2785* (2013.01); *G06T 11/206* (2013.01)

(58) Field of Classification Search
CPC .. G06F 17/28; G06F 17/2705; G06F 17/2785; G06F 17/24; G06F 3/04847; G06F 17/211; G06T 11/206
See application file for complete search history.

(56) References Cited

U.S. PATENT DOCUMENTS

| 4,752,889 A * | 6/1988 | Rappaport | G06N 5/022 700/83 |
|---|---|---|---|
| 4,953,106 A * | 8/1990 | Gansner | G06T 11/206 345/440 |
| 7,127,469 B2 * | 10/2006 | Lindblad | G06F 17/3071 |
| 7,689,557 B2 | 3/2010 | Pandit et al. | |
| 8,037,108 B1 * | 10/2011 | Chang | G06F 17/303 707/803 |

(Continued)

OTHER PUBLICATIONS

Yeh, Ching-Long et al., "Creation of Topic Map with Shallow Parsing in Chinese", IEEE International Conference on Information Reuse and Integration (IRI-2005), Aug. 15-17, 2005, 5 pages, IEEE Digital Library.

(Continued)

*Primary Examiner* — Edgar Guerra-Erazo
(74) *Attorney, Agent, or Firm* — Ference & Associates LLC (57) ABSTRACT

An embodiment provides methods and arrangements for visualizing and exploring natural-language text. In an embodiment, natural language text is received, and this is parsed to form a directed graph comprising a plurality of nodes. The directed graph is converted to an outline graph comprising core nodes and layer nodes. The outline graph is simplified, and there is created, for display on a user interface, an interactive visual representation of the simplified outline graph. Other variants and embodiments are broadly contemplated herein.

19 Claims, 10 Drawing Sheets

(56) References Cited

U.S. PATENT DOCUMENTS

| | | | |
|---|---|---|---|
| 8,335,754 B2 | 12/2012 | Dawson et al. | |
| 9,696,974 B2* | 7/2017 | Pamer | G06F 8/437 |
| 2004/0103091 A1* | 5/2004 | Lindblad | G06F 17/3071 |
| 2006/0150169 A1* | 7/2006 | Cook | G06F 8/10 717/156 |
| 2007/0171716 A1* | 7/2007 | Wright | G06T 11/206 365/185.12 |
| 2011/0225159 A1 | 9/2011 | Murray | |
| 2012/0313947 A1* | 12/2012 | Rope | G06T 11/206 345/440 |
| 2014/0282384 A1* | 9/2014 | Pamer | G06F 8/437 717/113 |
| 2014/0325666 A1* | 10/2014 | Gkoulalas-Divanis | G06F 17/30289 726/26 |
| 2015/0052175 A1* | 2/2015 | Bornea | G06F 17/30958 707/798 |
| 2016/0342628 A1* | 11/2016 | Van Rest | G06F 17/30926 |

OTHER PUBLICATIONS

Huang, Chuen-Min et al., "Knowledge-Oriented Dynamic Maps Construction for Real-time Online Content Transformation", 2007 National Computer Symposium (NCS), Dec. 20-21, 2007, 18 pages, Taichung, Asia University, College of Computer Science.

Akbik, Alan et al., "Propminer: A Workflow for Interactive Information Extraction and Exploration using Dependency Trees", Proceedings of the 51st Annual Meeting of the Association for Computational Linguistics, Aug. 4-9, 2013, Sofia, Bulgaria, pp. 157-162, 2013 Association for Computational Linguistics.

Stevenson, Mark et al., "Dependency Pattern Models for Information Extraction", Research on Language and Computation, Mar. 2009, pp. 13-39, vol. 7, Issue 1, Springer Science+Business Media B.V. 2009.

Van Ham, Frank et al., "Mapping Text with Phrase Nets", IEEE Transactions on Visualization and Computer Graphics, Nov./Dec. 2009, 8 pages, vol. 15, No. 6, IEEE Computer Society.

Yang, Huahai et al., "I Can Do Text Analytics! Designing Development Tools for Novice Developers", Changing Perspectives (CHI 2013), Apr. 27-May 2, 2013, Paris France, 10 pages, ACM Digital Library.

Grishman, Ralph et al., "An Information Extraction Customizer", TSD 2014, vol. 8655 of the series Lecture Notes in Computer Science, Text, Speech and Dialogue Chapter, 2014, pp. 3-10, Springer International Publishing, Switzerland.

Kriz, Vincent et al., "RExtractor: a Robust Information Extractor" 2015 Proceedings of NAACL-HLT, May 31-Jun. 5, 2015, Denver, Colorado, pp. 21-25, 2015 Association for Computational Linguistics.

Michael, Thilo et al., "Schnapper: a Web Toolkit for Exploratory Relation Extraction", Proceedings of ACL-IJCNLP 2015 System Demonstrations, Jul. 26-31, 2015, Beijing, China, pp. 67-72, 2015 ACL and AFNLP.

Gupta, Sonal et al., "Spied: Stanford Pattern-based Information Extraction and Diagnostics", Proceedings of the Workshop on Interactive Language Learning, Visualization, and Interfaces, Jun. 27, 2014, Baltimore, Maryland, USA, pp. 38-44, 2014 Association for Computational Linguistics.

He, Yifan et al., "ICE: Rapid Information Extraction Customization for NLP Novices", Proceedings of NAACL-HLT 2015, May 31-Jun. 5, 2015, Denver, Colorado, USA, pp. 31-35, 2015 Association for Computational Linguistics.

Abiteboul, Serge et al., "The Lorel query language for semistructured data", International Journal on Digital Libraries, Apr. 1997, vol. 1, Issue 1, 21 pages, Springer-Verlag.

Gildea, Daniel et al., "Automatic labeling of semantic roles", Journal of Computational Linguistics, Sep. 2002, vol. 28, Issue 3, 44 pages, MIT Press, Cambridge, MA, USA.

\* cited by examiner

FIG. 1

| Label | Children | Attributes |
|-------|----------|------------|
| verb  | role*    | tense, voice |
| role  | np \| verb | plurality |
| np    | adj? . prep? | |
| adj   |          | |
| prep  | np       | |

# VISUALIZING AND EXPLORING NATURAL-LANGUAGE TEXT

BACKGROUND

Information Extraction (IE) is the operation of extracting structured information from unstructured, machine readable text. The ubiquity of text data in modern data sources has made IE a critical component in a wide range of applications; just by way of non-restrictive example, such applications can include brand management, customer relationship management, regulatory compliance, and life sciences. To develop an IE program (also referred to herein as an "extractor"), a common practice is to construct patterns, either manually or automatically, and use the patterns to extract information over (or regarding) an input text.

Generally, as dependency parsers have become faster and more reliable, deep syntactic information has gained popularity as the input basis for extraction patterns. While such patterns can be produced automatically by way of machine learning, it has been shown that hand crafted patterns often outperform machine learning alternatives. However, such crafting is generally very labor-intensive and requires developers to be sufficiently trained in natural language processing, and capable of understanding and reasoning about dependency trees. Accordingly, among other problems, this can set an unreasonably high bar for their general use.

BRIEF SUMMARY

In summary, one aspect of the invention provides a method of processing and visualizing natural language text, said method comprising: utilizing at least one processor to execute computer code that performs the steps of: receiving natural language text; parsing the received natural language text to form a directed graph comprising a plurality of nodes; converting the directed graph to an outline graph comprising core nodes and layer nodes; and creating, for display on a user interface, an interactive visual representation of the outline graph.

Another aspect of the invention provides an apparatus for processing and visualizing natural language text, said apparatus comprising: at least one processor; and a computer readable storage medium having computer readable program code embodied therewith and executable by the at least one processor, the computer readable program code comprising: computer readable program code configured to receive natural language text; computer readable program code configured to parse the received natural language text to form a directed graph comprising a plurality of nodes; computer readable program code configured to convert the directed graph to an outline graph comprising core nodes and layer nodes; and computer readable program code configured to create, for display on a user interface, an interactive visual representation of the outline graph.

An additional aspect of the invention provides a computer program product for processing and visualizing natural language text, said computer program product comprising: a computer readable storage medium having computer readable program code embodied therewith, the computer readable program code comprising: computer readable program code configured to receive natural language text; computer readable program code configured to parse the received natural language text to form a directed graph comprising a plurality of nodes; computer readable program code configured to convert the directed graph to an outline graph comprising core nodes and layer nodes; and computer readable program code configured to create, for display on a user interface, an interactive visual representation of the outline graph.

A further aspect of the invention provides a method comprising: utilizing at least one processor to execute computer code that performs the steps of: receiving natural language text; performing semantic parsing on the received natural language text to form, based on an input schema, a directed graph comprising a plurality of nodes; converting the directed graph to an outline graph comprising core nodes and layer nodes; contracting the outline graph via combining two or more nodes sharing at least one similar characteristic; creating, for display on a user interface, an interactive visual representation of the outline graph; wherein the interactive visual representation affords development of an information extractor and comprises a stylized view of the outline graph; said creating comprising permitting one or more user-initiated operations with respect to the interactive visual representation, and propagating the one or more user-initiated operations back to the directed graph; and automatically generating an extraction program based on the outline graph.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-9. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an exemplary embodiment, most if not all of the process steps, components and outputs discussed with respect to FIGS. 1-9 can be performed or utilized by way of a processing unit or units and system memory such as those indicated, respectively, at 16' and 28' in FIG. 10, whether on a server computer, a client computer, a node computer in a distributed network, or any combination thereof.

Figure 1:
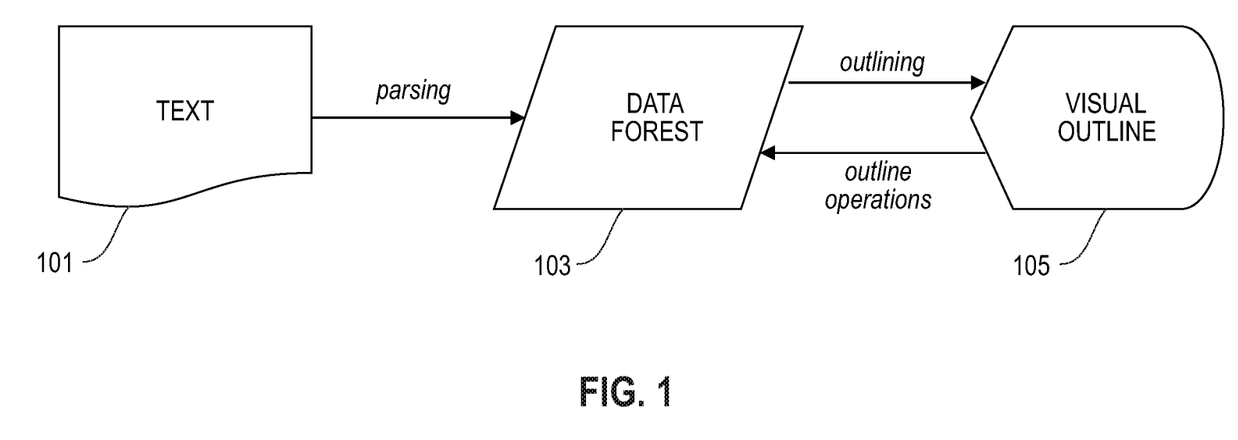
FIG. 1 schematically illustrates a general framework for facilitating document outlining and exploration.
Figure 8:
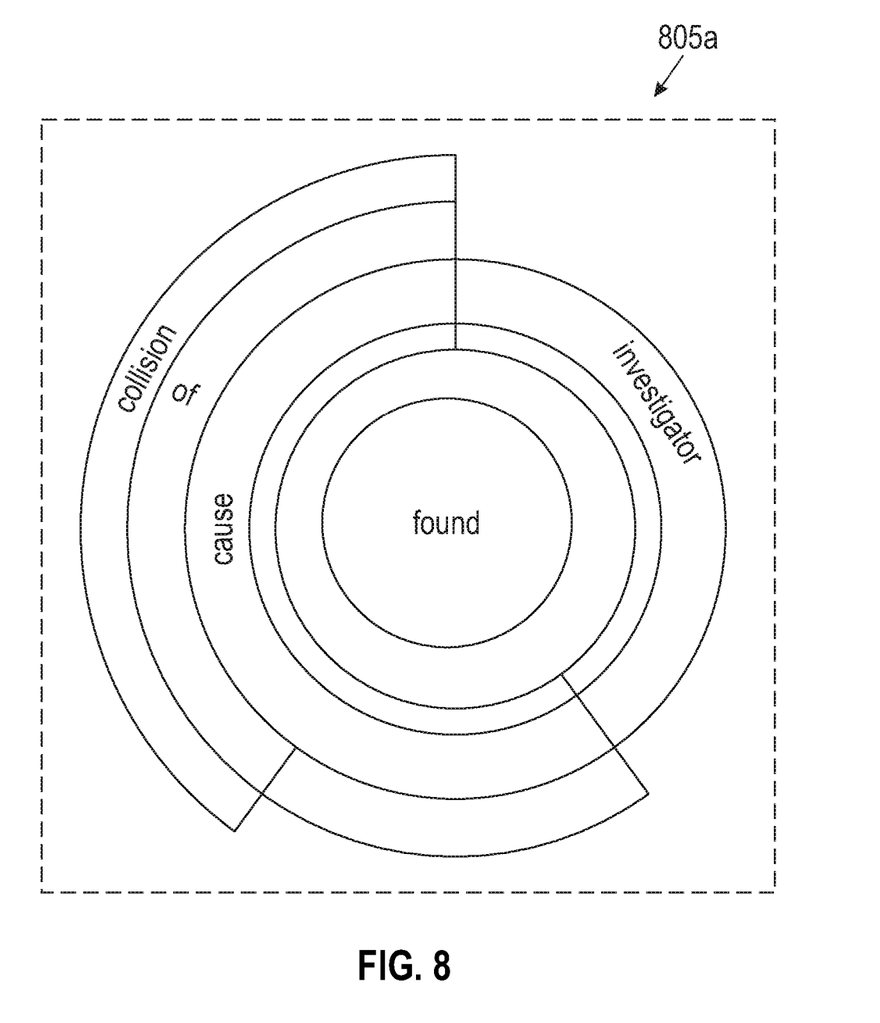
FIG. 8 illustrates a restricted visualization in a text palette.

To facilitate easier reference, in advancing from FIG. 1 to and through FIG. 8 a reference numeral is advanced by a multiple of 100 in indicating a substantially similar or analogous component or element with respect to at least one component or element found in at least one earlier figure.

Broadly contemplated herein, in accordance with at least one embodiment of the invention, are methods and arrangements for providing a framework that establishes a concise, intuitive and comprehensive abstraction of textual data, leveraging linguistic tools such as shallow semantic parsing. This can involve an implementation within a "text palette" arrangement, itself an interactive visualization system for exploring and extracting natural-language text. Generally, such a "text palette" can help novice users with producing high-quality extractors on real tasks more quickly and effectively, and with less effort, as compared to conventional tools.

The features discussed above, and others, relating to at least one embodiment of the invention, will be better appreciated from the discussion which follows.

Generally, in accordance with at least one embodiment of the invention, to facilitate IE development there is broadly contemplated herein a framework for visualizing and exploring natural language text. A general framework, as illustrated in FIG. 1, involves translating shallow parsing of a document collection into an outline graph, that itself can be visualized in a compact and simple manner. As will be better understood and appreciated herebelow, input text (e.g., a document collection) 101 is thus transformed via shallow parsing into a data forest 103. Via outlining, a visual outline 105 is created, and outline operations performed thereupon can be propagated back to the data forest 103.

In accordance with at least one embodiment of the invention, more particularly, the general framework illustrated in FIG. 1 supports exploration by way of editing operations over an outline graph (or, more precisely, its visualization— or visual outline—105). These operations propagate back to the shallow-parsing structures (i.e., to data forest 103) so that editing is properly reflected in the outline graph, which is used for automatic extractor construction. This framework is implemented in a "text palette", the structure and functioning of which can be appreciated from the ensuing discussion, to allow novice users to explore natural language text and generate extractors. Generally, embodiments as broadly contemplated herein, especially involving a visualization and interaction model, can greatly facilitate the development of extraction patterns by novice developers, inasmuch as they will be able to build extractors more quickly and with less effort.

In accordance with at least one embodiment of the invention, two major components are utilized: a data forest and an outline graph. The former captures essential information of the document collection as a forest of semantic parsing structures, and the latter summarizes the data forest for visualization and exploration.

In accordance with at least one embodiment of the invention, a data model draws from standard formalisms for semi-structured (or XML) data. Broadly contemplated herein is the notion of a schema that concisely specifies the structure of semi-structured (tree) data, and the schema is used to guide the construction of a data forest. A schema defines a set of permitted node labels, and for each label specifies two restrictions on corresponding nodes: (1) the permitted sequences of children labels (e.g., via a regular expression), and (2) the set of attributes. Moreover, the schema specifies a distinguished root label. A structure, as broadly contemplated herein, involves that of shallow semantic parsing for a text collection. The schema (207) in FIG. 2, which can be referred to throughout the ensuing discussion, is a simplified version of an actual schema that can be used.

Figure 2:
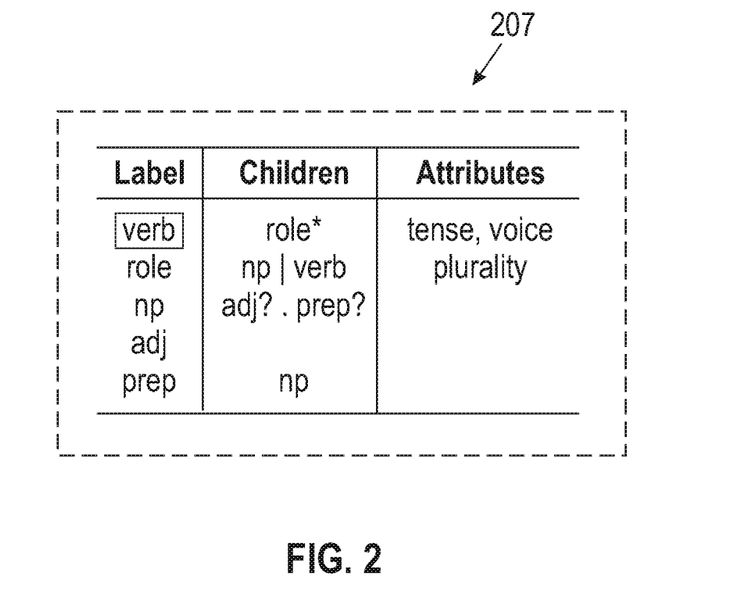
FIG. 2 illustrates a schema for specifying a structure of tree data and for guiding construction of a data forest.
Figure 3:
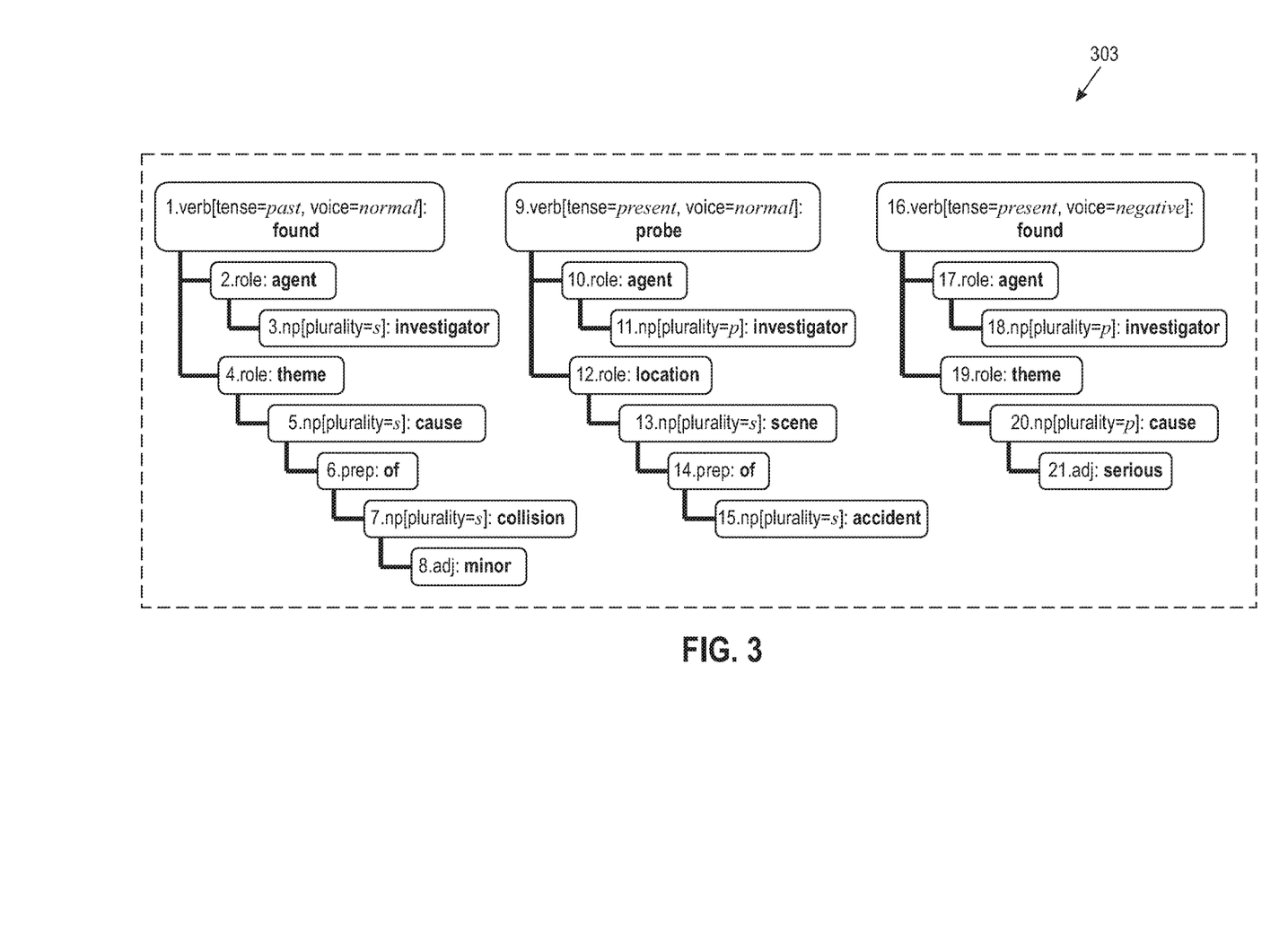
FIG. 3 schematically illustrates a working example of a data forest.

In accordance with at least one embodiment of the invention, FIG. 3 schematically illustrates a (non-restrictive) working example of a data forest 303 and its component parts (including, nodes numbered 1-21), conforming to the schema 207 of FIG. 2. As such, a data forest 303 is a directed forest graph such that each node is associated with the following elements: (1) an identifier, (2) a label, (3) a value, (4) a set of attributes, and (5) a mapping from attributes to values. A data forest (hereinafter also referred to generally with the label F) conforms to a schema S if: it contains only labels from S; each node v of F has children and attributes that satisfy the restrictions of S for the label of v; and all the tree roots have the root label of S.

In accordance with at least one embodiment of the invention, by way of the present illustrative and non-restrictive working example relating to data forest 303, two sentences can be visualized:

(1) The investigator found the cause of the minor collision.

(2) The investigators are now probing the scene of an accident but are not yet finding any serious causes.

As such, data forest 303 represents the result of applying shallow semantic parsing to the sentences. Each node is represented by id.lbl[$a_1=f_1, \ldots, a_k=f_j$]:val, where id is the identifier, lbl is the label, $a_1, \ldots, a_k$ are the attribute names taking the values $f_1, \ldots, f_k$, respectively, and val is the value. The roots in the figure are the topmost nodes, namely 1, 9, and 16. Each root has the label verb, as the schema 207 of FIG. 2 requires. As also required by that schema, the children of each verb node are all role nodes. Here, merely by way of an illustrative working example, role names (agent, theme, etc.) are adopted as used by the "VerbNet" online lexicon. Also, the values of nodes correspond to lemmata of words; for example, both investigator and investigators result in the value investigator.

Figure 4:
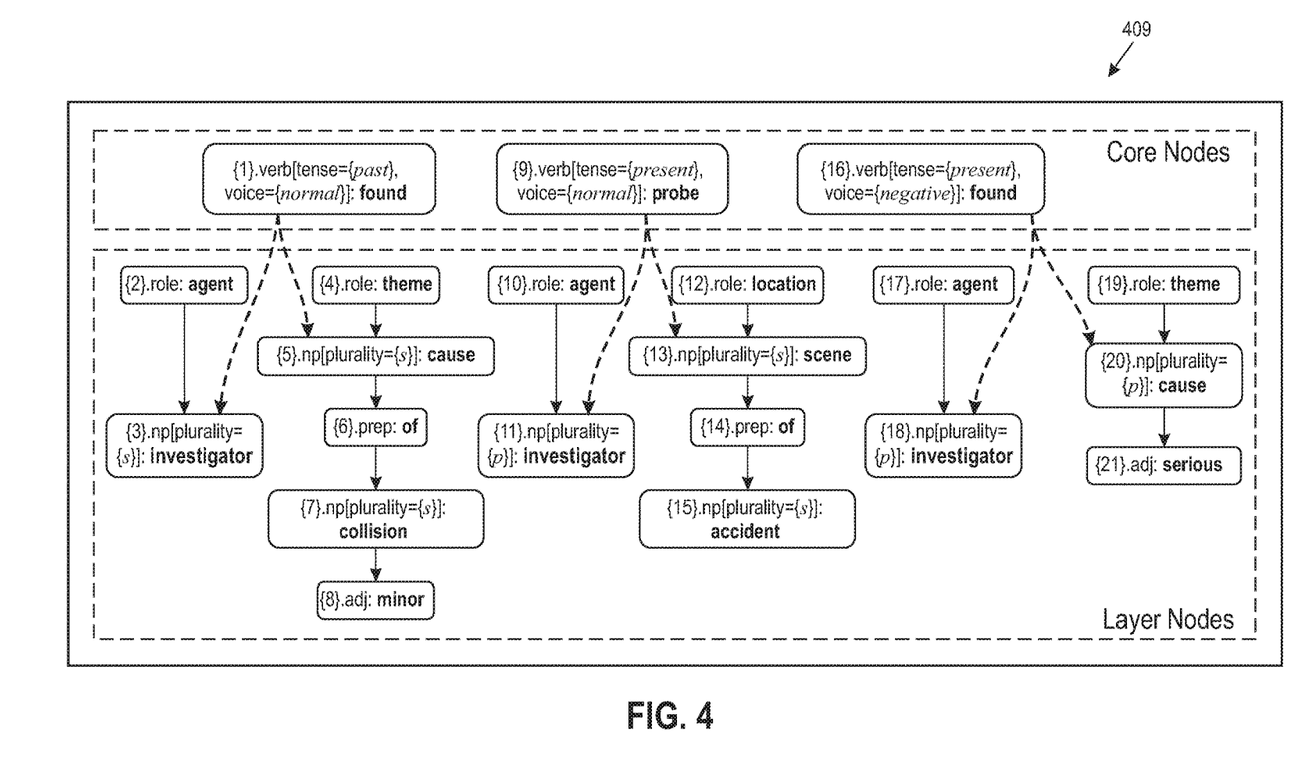
FIG. 4 schematically illustrates a working example of an outline graph.
Figure 5:
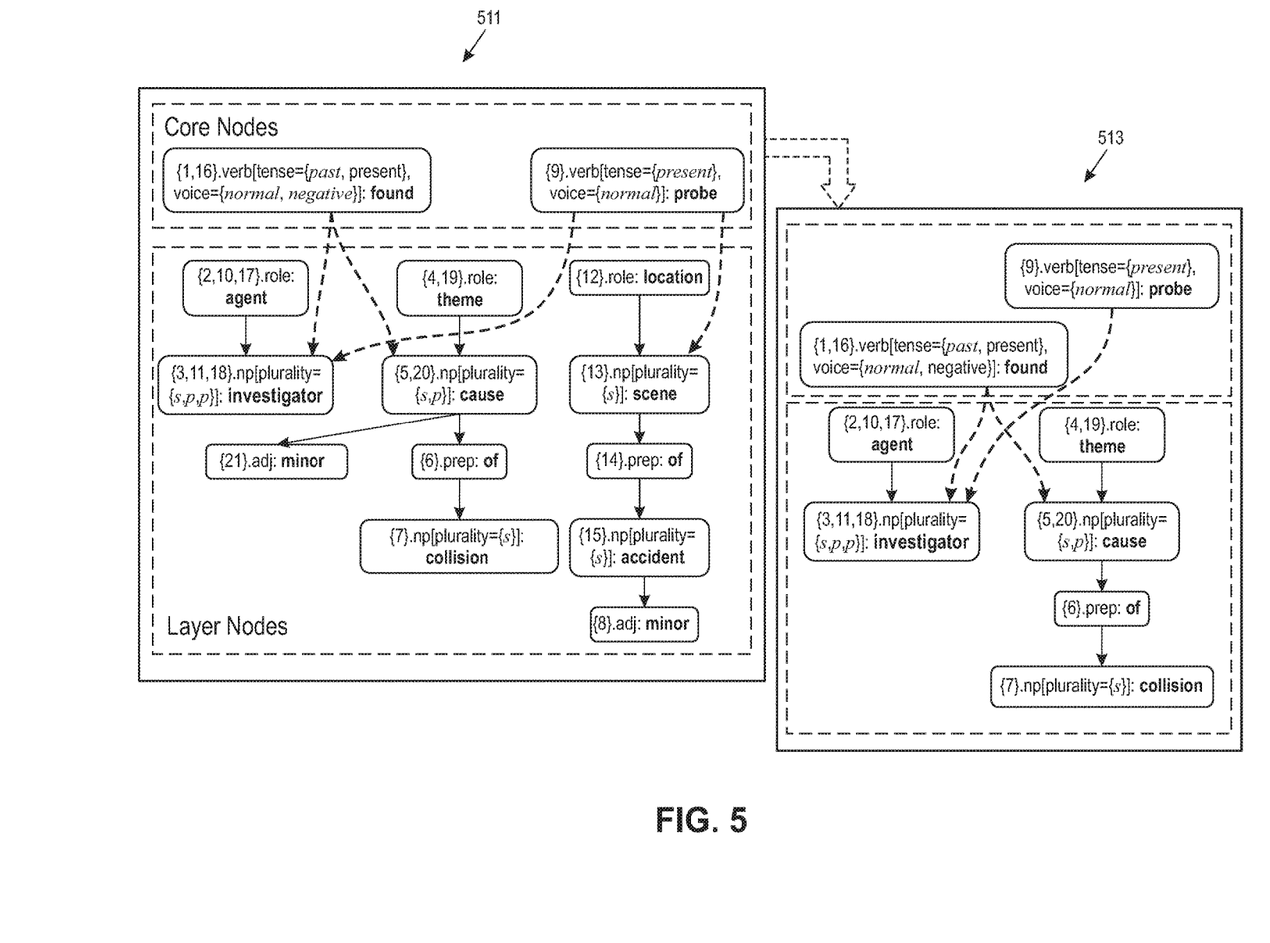
FIG. 5 schematically illustrates a working example of a maximal contraction and a reduction of an outline graph.

In accordance with at least one embodiment of the invention, an outline graph is created in a process of translating a data forest into a corresponding "outline" version. As such, let F be a data forest over a given schema. An outline node u for F represents a group V of nodes in F. The structure of u is similar to a node of a data forest, except for two differences. First, instead of an identifier it has a set of identifiers of nodes from F (i.e., the identifiers of the nodes in V), where all those nodes have the same label as u. Secondly, each attribute is mapped to a bag (multiset) of values, rather than a single value; the multiplicity of an attribute value a is precisely the number of nodes v∈V, with the value a for that attribute. An outline graph for F is a directed and unordered graph G, such that the nodes of G are outline nodes for F with pairwise disjoint sets of node identifiers. Moreover, G has two types of nodes: core nodes and layer nodes, such that: the subgraph of G induced by the layer nodes is a forest; and all the edges that are incident to core nodes enter only layer nodes. As will be better appreciated herebelow, FIGS. 4 and 5 depict different outline graphs for the data forest 303 of FIG. 3, wherein core nodes are represented by grey boxes.

As such, the disclosure now turns to a discussion, in accordance with at least one embodiment of the invention, of two types of processes that may be applied when provided with a data forest. As initially referred to in FIG. 1, an outlining procedure converts the data forest 103 into an outline graph (which, itself, can be transformed to a visual outline 105), while outline operations are applied to the outline graph and are propagated back to the data forest 103 (of which outlining results in a new outline graph). Further details may be appreciated from the ensuing discussion, specifically with reference to the illustrative and non-restrictive working examples provided by FIGS. 4 and 5. As such, a process of outlining involves a sequence of three steps: conversion, contraction and reduction, as described herebelow. As will also be better appreciated herebelow, FIG. 4 schematically illustrates a conversion of the data forest (303) of FIG. 3 to an outline graph (409), while FIG. 5 schematically illustrates, respectively, a maximal contraction (511) and a reduction (513) of the outline graph 409 (of FIG. 4).

In accordance with at least one embodiment of the invention, conversion of a forest graph F into an outline graph G is a straightforward translation from the data-forest model to the outline-graph model, and can be done as follows. First, every node of F is transformed into a unique node of G by replacing the identifier and attribute values with corresponding singleton sets. The roots of F become the core nodes of G, and all the remaining nodes become layer nodes. An edge is added from one layer node to another whenever a corresponding edge exists in F. Finally, edges are added from core nodes to layer nodes. There needn't be a strict definition of when such edges are added. By way of an illustrative and non-restrictive example, an edge is added from a core node to a layer node if they correspond to a grandparent-grandchild relationship in F. The outline graph G obtained in a conversion step (as just described) can be denoted as Cnvr (F). As an illustrative and non-restrictive example, FIG. 4 shows Cnvr(F) (at 409) for the data forest F (303) of FIG. 3. Thus, the root nodes of F correspond to the core nodes of G, and the remaining nodes of F correspond to the layer nodes of G. Also, it can be observed that G has an edge from node 1 to node 3 since node 3 is a grandchild of node 1 in F, and G has an edge from node 2 to node 3 since node 3 is a child of node 2 in G.

In accordance with at least one embodiment of the invention, a contraction step may proceed as follows. Let G be an outline graph, and let $G_f$ be the forest induced by the layer nodes of G. Two nodes u and v of G are said to be "contractible" if v and u have the same label and value, and one of the following three conditions holds: (1) u and v are both core nodes; (2) u and v are both roots in $G_f$; or (3) u and v are siblings. As an illustrative and non-restrictive example, in graph 409 of FIG. 4, nodes 1 and 16 are contractible since they have the same label and value (verb: found), and both are core nodes; nodes 2, 10 and 17 are contractible since they have the same label and value (role: agent) and all constitute roots in the layer forest.

Continuing, in accordance with at least one embodiment of the invention, let u and v be contractible nodes. When u and v are contracted, a new node w is created that is identical to u and v, except that its set of node identifiers is the (disjoint) union of those of u and v, and the bag of values for each attribute is the (bag) union of those of u and v. Then, u and v are removed from G, and w is added with all the incoming and outgoing edges of u and v. It can be seen that contraction results in a new outline graph for F; in the present working example, this new outline graph is indicated at 511 in FIG. 5. For example, the node that mentions {1, 16} in contraction 511 (top-left node) is the result of contracting nodes 1 and 16 in graph 409 of FIG. 4, and the node that mentions {2, 10, 17} is the result of contracting nodes 2, 10 and 17. It can be seen that after contracting 2, 10 and 17, the nodes 3, 11 and 18 become contractible, since they have the same label and value (np: investigator) and they are now siblings. As such, a maximal contraction of G (as at 511) is the result of repeatedly contracting (contractible) node pairs while such pairs exist. It can be shown that all maximal contractions of G are isomorphic; henceforth the maximal contraction is denoted herein as Cntr(G).

In accordance with at least one embodiment of the invention, a reduction step may proceed as follows. To start, the conversion and contraction steps applied thus far establish the outline graph Cntr(Cnvr(F)). However, this outline graph can prove to be too large to render for a user display, thus a reduction step can also be applied; in the present working example, this results in the graph indicated at 513 in FIG. 5. Thus, for such a reduction step, let G be an outline graph for a data forest F over a schema S. A weight function W is defined over the nodes of G to score their relative importance. There can be various ways of defining the weight W(v) of a node v of G. In one such definition, W can correspond to (or equate to) the number of nodes that v represents. In a specific (illustrative and non-restrictive) working example, a data forest F can be formed from many small documents, wherein W(v) can then be the number of distinct documents of the nodes represented by v. (Essentially any suitable attribute(s) may be employed to determine what constitutes a "distinct document".) The reduction operation on G has three parameters, $m_c$, $m_r$, and $M_l$, where $m_c$ and $m_r$ are natural numbers, and $M_l$ is a mapping from the layer nodes of G into natural numbers.

In accordance with at least one embodiment of the invention, the following is done when reducing G. First, all core nodes of G are deleted except for the $m_c$ of those with the highest weights. Second, there are deleted all roots of the forest F induced by the layer nodes of G, except for the $m_r$ of those with the highest weights. Third, for each layer node v of G, there are removed all the children of v except for the $M_l$ (v) of those having the highest weights. The parameters $m_c$, $m_r$ and $M_l$ can be determined in any suitable manner, preferably in view of display limitations. Indeed, graph 513 in FIG. 5 represents the reduction of the (maximal contraction) outline graph 511, where W(v) is the number of nodes represented by v, and the parameters are $m_c=2$, $m_r=2$, and $M_l(v)=1$ for every v.

It can be observed, in accordance with at least one embodiment of the invention, that reduction results in a new outline graph for F, but the result is not necessarily unique; this is attributable to possible ties in weights (that is, a presence of two or more nodes that end up having the same weight W). For instance, in the present (illustrative and non-restrictive) working example, in view of a tie, either node {21} or node {6} could be removed. As such, ties can be broken by a linear predefined order on labels and values, and hence, assure uniqueness. (In the present example, prep: of is preferred to adj: serious.) This unique result is defined by Rduc(G). Hence, the final outline (OL) graph is expressed by $OL(F) \stackrel{def}{=} Rduc(Cntr(Cnvr(F)))$.

The disclosure now turns to a procedure of outline operations, in accordance with at least one embodiment of the invention. Accordingly, to explore a data forest, a user can apply operations to the outline graph in order to restrict the view to the fragment of interest. These operations are in reality propagated to the data forest F and are not applied directly to the outline graph. (This can be appreciated, among other things, from the general overview in FIG. 1, where operations are propagated back to the data forest 103.) In effect, the procedure starts via displaying the outline graph G=OL(F) to the user, whereupon every user operation entails two steps: (1) propagating the operations to F to obtain an updated data forest F'; and (2) replacing G with OL(F'). For each operation, the resulting F' ends up being described. The ensuing discussion covers operations of deletion and restriction.

Figure 6:
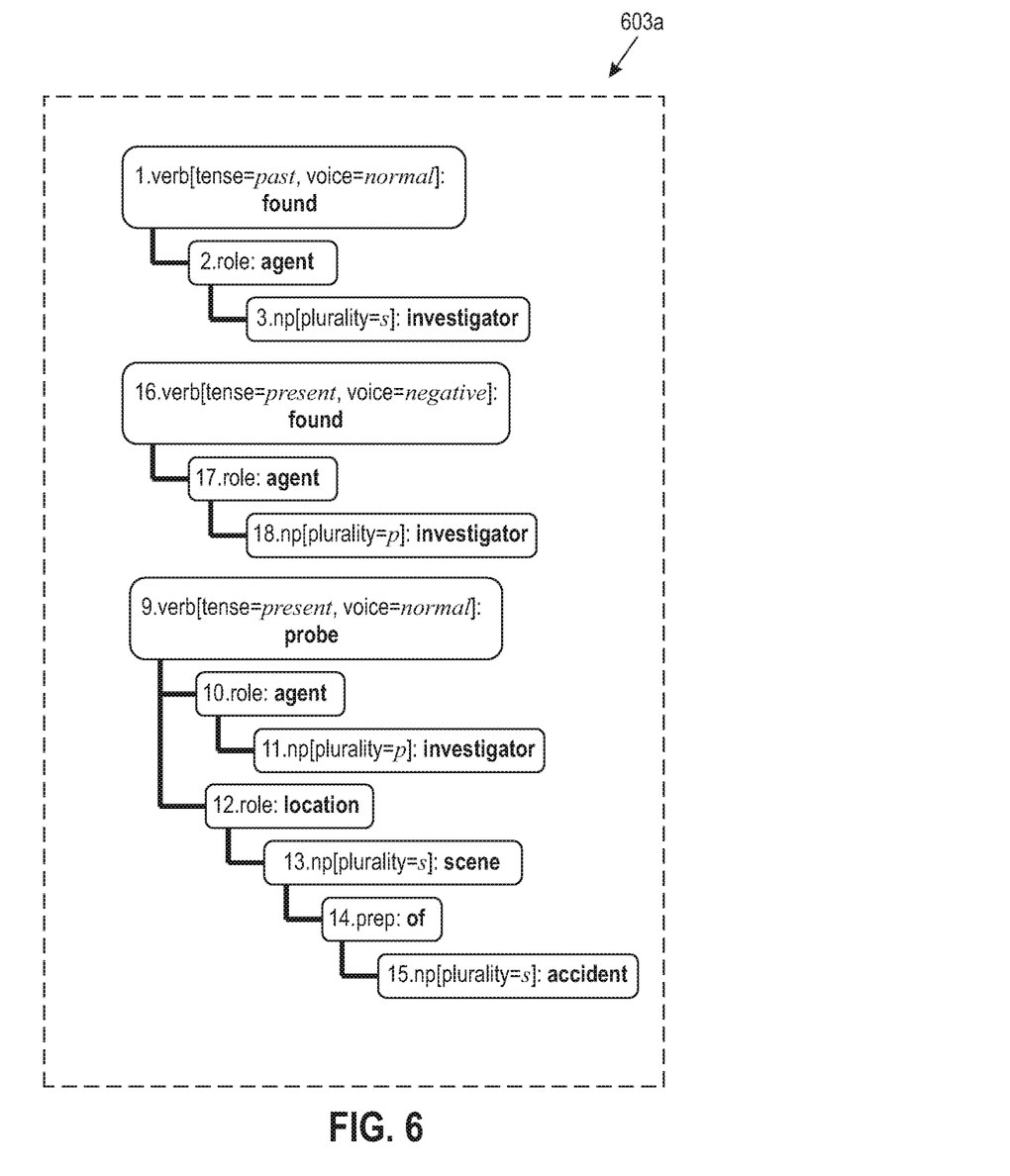
FIG. 6 schematically illustrates a working example of a revised data forest, resulting from deletion of a node.

In accordance with at least one embodiment of the invention, deletion involves deleting a node v of the outline graph G. The result F' of applying the deletion of v can be obtained as follows. First, there are deleted from F all the nodes u with an identifier in v. When a node u is removed, all of its descendants in F are deleted from F as well. There are then removed additional nodes in a manner to ensure the validity of F, as follows. Recall that the schema S defines (e.g., by a regular expression) the permitted sequences of children labels for a node u. But deletion of nodes from F may result in violation of S, and to ensure validity there is deleted from F every node u such that the sequence of labels of the children of u are not permitted by S. As an example, consider again, in FIG. 5, the (reduction) outline graph G (513) for the data forest F (303) of FIG. 3. Let v be the cause node of G. FIG. 6 shows a revised data forest 603a, resulting from the deletion of v. Observe that not only the nodes 5 and 20 are deleted from F (i.e., the "original" data forest 303), but also their descendants, and their parents, namely nodes 4 and 19. The reason that nodes 4 and 19 are deleted is the fact that the schema S (207 in FIG. 2) requires a role node to have a child (labeled np or verb), but after deleting nodes 5 and 20 the nodes 4 and 19 become childless.

In accordance with at least one embodiment of the invention, a restriction operation is applicable only to core nodes (which represent the roots of F). In this operation, a filter is effectively defined over the root nodes of F, and the resulting F' is obtained from F by removing every tree with a root violating the filter condition. In the present (illustrative and non-restrictive) working example, conditions such as "the value is found" or "the value is a synonym of probe" are permitted. As an example, consider the condition "the value is found." In the (reduction) outline graph G (513) of FIG. 5 for the data forest F (303) of FIG. 3, only node v satisfies the condition, and it contains the identifiers 1 and 16. Therefore, the restriction operation deletes from F the tree that is rooted at node 9. By way of another example, attribute restriction can restrict a specific core node to the roots of F with certain values for certain attributes. As an example, let v be the found node in (reduction) outline graph 513 of FIG. 5, and let the condition be voice=positive. Then for the data forest F (303) of FIG. 3, restriction results in deleting the bottom tree (that is rooted with node 16).

Figure 7:
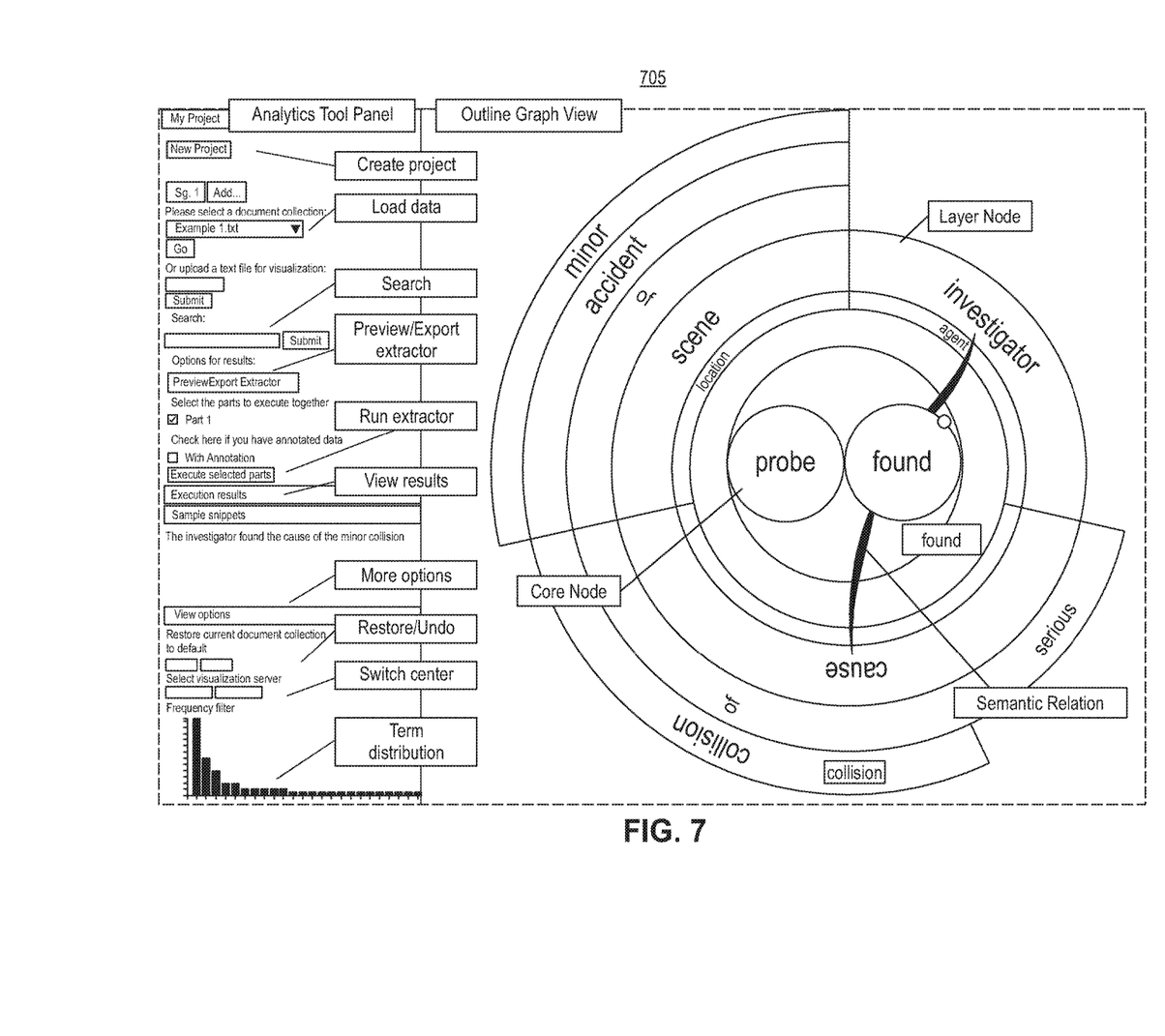
FIG. 7 illustrates a screenshot of a text palette.

In accordance with at least one embodiment of the invention, a process of visualization can involve an interactive visual interface, in the form of a "text palette", as now will be described. FIG. 7 thus illustrates a screenshot of a text palette 705, showing two main panels: an outline graph view and an analytics tool panel. The former visually summarizes semantic information from text based on the outline graph, while the latter provides different auxiliary controls to help users explore and interact with the outline graph.

In accordance with at least one embodiment of the invention, for an outline graph view, the text palette uses a modified RSF sunburst to present the maximal contracted outline graph built for a document collection. It can be appreciated that such a visualization is useful for hierarchical data structures with moderate depth and complexity, and also offers the flexibility of overlaying links on top of the hierarchical structure. As shown in FIG. 7, the inner circles of the visualization lay out the core nodes, and the arcs represent the layer nodes in the (maximal contraction) outline graph 511 in FIG. 5. Core nodes from that outline graph (i.e., verbs in the present working example) are placed in the center, as shown in FIG. 7. The arcs can be color-coded (or differently shaded) based on role types. Hovering over an arc will show a small popup with its label (e.g., collision in FIG. 7). The arc width and the circle node radius encode the word frequency appearing in the document collections, indicating their overall importance. Semantic relationships among verbs and roles, shown as the dashed links in the (maximal contraction) outline graph 511 in FIG. 5, are encoded visually here, as with the elongated curved links or "arms" (e.g., extending from core node "found") in FIG. 7. To avoid visual cluttering, links can be made to be visible, e.g., solely when mousing over a core node in the center, or over an arc that contains a role. Link width can indicate the frequency of the corresponding semantic relations.

In accordance with at least one embodiment of the invention, the analytics tool panel provides additional functions to interact with and analyze the outline graph, such as the ability to restore changes on visualization, to switch the position of the core nodes and the arc nodes (e.g., the default visualization is verb-centric, but a user can choose to switch to role-centric), to display the frequency distribution of the core nodes, to filter the core nodes based on a frequency threshold, and to search among the core nodes. An extractor program is automatically generated based on the current state of the outline graph. A user can execute the extractors, or preview and export the automatically generated extractor.

In accordance with at least one embodiment of the invention, for the purpose of exploring text, it can be appreciated that the degree of interactive visualization afforded by the text palette 705 helps users to quickly understand the documents and answer questions such as "What are the common actions?" or "Who does what to whom?" For instance, by way of the highlighted links in FIG. 7, it is easy to suggest semantic patterns such as "investigator (agent)-probe (verb)-scene (theme)". More importantly, the text palette 705 allows the user to explore the documents and restrict visualization to a subset of the text by enabling the outline operations presented earlier. Specifically, a user can delete words directly from the outline graph view by using a "close" button on each node; or restrict by: focusing on one core node by right-clicking on that node and selecting "Focus" in a pop-up menu; or searching for one or more core nodes using the search box in the Analytic Tool Panel; or choosing the desired attribute value (e.g. tense=present) for a certain verb through its pop-up menu. For example, to restrict the visualization in FIG. 7 to show only "found" events, the user can either remove the verb probe in the center, or focus on or search for "found", which then results in the visualization 805a in FIG. 8. Users can also undo any of their interactions with the outline graph.

It can be appreciated from the foregoing that, in accordance with at least one embodiment of invention, a technical improvement is represented at least via provision of a framework that establishes a concise, intuitive and comprehensive abstraction of textual data, leveraging linguistic tools such as shallow semantic parsing, wherein this can involve an implementation within a "text palette" arrangement, itself an interactive visualization system for exploring and extracting natural-language text.

In accordance with at least one embodiment of the invention, very generally, quantitative values as determined herein, or other data or information as used or created herein, can be stored in memory or displayed to a user on a screen, as might fit the needs of one or more users.

Figure 9:
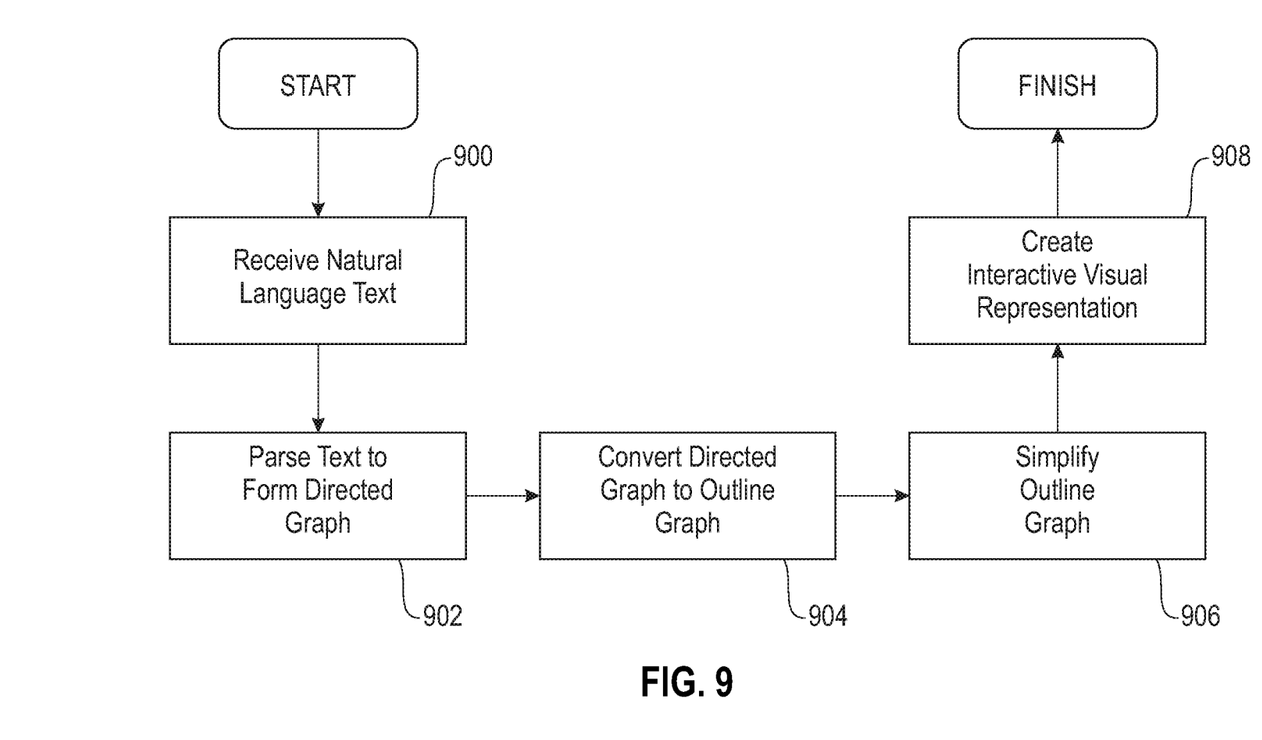
FIG. 9 sets forth a process more generally for processing and visualizing natural language text.

FIG. 9 sets forth a process more generally for processing and visualizing natural language text, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way of a processing unit or units and system memory such as those indicated, respectively, at 16' and 28' in FIG. 10.

As shown in FIG. 9, in accordance with at least one embodiment of the invention, natural language text is received (900), and this is parsed to form a directed graph comprising a plurality of nodes (902). The directed graph is converted to an outline graph comprising core nodes and layer nodes (904). The outline graph is simplified (906), and there is created, for display on a user interface, an interactive visual representation of the simplified outline graph (908).

Figure 10:
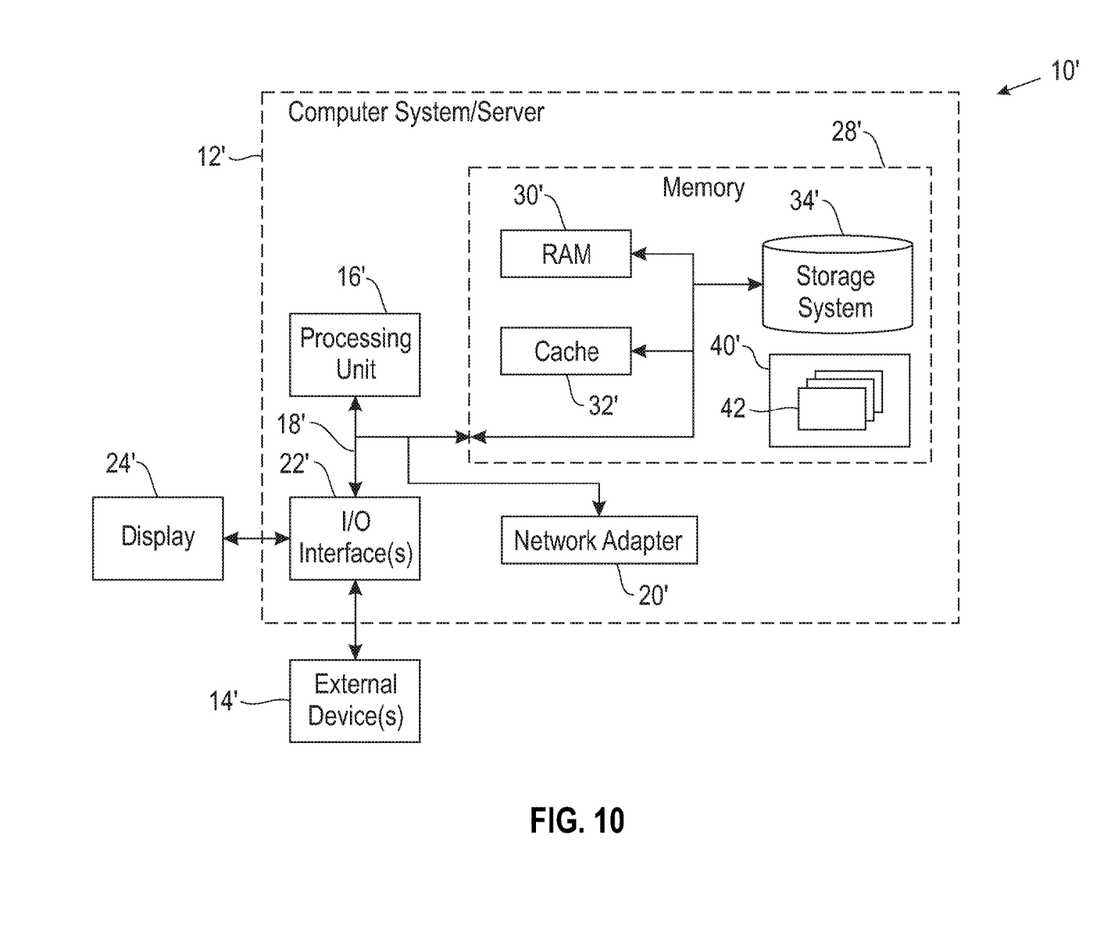
FIG. 10 illustrates a computer system.

Referring now to FIG. 10, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing and visualizing natural language text, said method comprising:
utilizing at least one processor to execute computer code that performs the steps of:
receiving natural language text;
parsing the received natural language text to form a data forest comprising a directed graph comprising a plurality of nodes, each of the plurality of nodes being associated with (i) an identifier, (ii) a label, (iii) a value, (iv) a set of attributes, and (v) a mapping from attributes to values;
converting the directed graph to an outline graph comprising core nodes and layer nodes, wherein the converting comprises (i) grouping nodes of the data forest having the same label and assigning a set of identifiers to the grouped nodes and (ii) mapping each attribute to a multiset of values for nodes of the data forest having the same attribute; and
creating, for display on a user interface, an interactive visual representation of the outline graph, wherein the interactive visual representation comprises an outline graph view and an analytics tool panel, wherein the outline graph view comprises a visual representation of a summarized view of the natural language text based on the outline graph and wherein the analytics tool panel provides controls for interacting with the outline graph view;
the creating comprising simplifying the outline graph by reducing the outline graph by weighting the nodes within the outline graph based upon a relative importance of the node with respect to other nodes and removing nodes having a weight below a predetermined value.

2. The method according to claim 1, wherein the directed graph is formed based on an input schema.

3. The method according to claim 1, wherein said parsing comprises semantic parsing.

4. The method according to claim 1, wherein:
wherein the set of identifiers and the multiset of values comprises singleton sets; and
wherein said converting comprises
adding edges from core nodes to layer nodes.

5. The method according to claim 1, comprising simplifying the outline graph, wherein said simplifying comprises contracting the outline graph via combining two or more nodes sharing at least one similar characteristic.

6. The method according to claim 5, wherein said reducing is performed on the contracted outline graph via.

7. The method according to claim 6, wherein:
said removing is governed by one or more characteristics relating to a size of the interactive visual representation to be displayed on the user interface.

8. The method according to claim 5, wherein said contracting comprises combining two nodes given at least one of the following conditions (i), (ii) and (iii):
(i) both of the two nodes are core nodes;
(ii) both of the two nodes are roots in a data forest induced by the layer nodes; and
(iii) both of the two nodes are sibling nodes.

9. The method according to claim 1, wherein said creating comprises:
automatically generating an extraction program based on the outline graph; and
executing the automatically generated extraction program.

10. The method according to claim 1, wherein said creating comprises permitting one or more user-initiated operations with respect to the interactive visual representation, and propagating the one or more user-initiated operations back to the directed graph.

11. The method according to claim 10, wherein the one or more user-initiated operations comprise deleting a node in the interactive visual representation.

12. The method according to claim 10, wherein the one or more user-initiated operations comprise defining a filter over one or more core nodes represented in the interactive visual representation.

13. The method according to claim 10, wherein said creating comprises creating a revised interactive visual representation in response to the one or more user-initiated operations.

14. The method according to claim 1, wherein the interactive visual representation comprises a stylized view of the outline graph.

15. The method according to claim 14, wherein the stylized view of the outline graph comprises: a stylized representation of the core nodes in a visually central position; and
a stylized representation of the layer nodes in at least one position removed from the visually central position.

16. The method according to claim 14, wherein the interactive visual representation comprises a panel of auxiliary controls to assist a user in exploring and interacting with the stylized view of the outline graph.

17. An apparatus for processing and visualizing natural language text, said apparatus comprising:

at least one processor; and a computer readable storage medium having computer readable program code embodied therewith and executable by the at least one processor, the computer readable program code comprising:

computer readable program code configured to receive natural language text;

computer readable program code configured to parse the received natural language text to form a data forest comprising a directed graph comprising a plurality of nodes, each of the plurality of nodes being associated with (i) an identifier, (ii) a label, (iii) a value, (iv) a set of attributes, and (v) a mapping from attributes to values;

computer readable program code configured to convert the directed graph to an outline graph comprising core nodes and layer nodes, wherein the converting comprises (i) grouping nodes of the data forest having the same label and assigning a set of identifiers to the grouped nodes and (ii) mapping each attribute to a multiset of values for nodes of the data forest having the same attribute; and computer readable program code configured to create, for display on a user interface, an interactive visual representation of the outline graph, wherein the interactive visual representation comprises an outline graph view and an analytics tool panel, wherein the outline graph view comprises a visual representation of a summarized view of the natural language text based on the outline graph and wherein the analytics tool panel provides controls for interacting with the outline graph view;

the creating comprising simplifying the outline graph by reducing the outline graph by weighting the nodes within the outline graph based upon a relative importance of the node with respect to other nodes and removing nodes having a weight below a predetermined value.

18. A computer program product for processing and visualizing natural language text, said computer program product comprising:

a non-transitory computer readable storage medium having computer readable program code embodied therewith, the computer readable program code comprising:

computer readable program code configured to receive natural language text;

computer readable program code configured to parse the received natural language text to form a data forest comprising a directed graph comprising a plurality of nodes, each of the plurality of nodes being associated with (i) an identifier, (ii) a label, (iii) a value, (iv) a set of attributes, and (v) a mapping from attributes to values;

computer readable program code configured to convert the directed graph to an outline graph comprising core nodes and layer nodes, wherein the converting comprises (i) grouping nodes of the data forest having the same label and assigning a set of identifiers to the grouped nodes and (ii) mapping each attribute to a multiset of values for nodes of the data forest having the same attribute; and computer readable program code configured to create, for display on a user interface, an interactive visual representation of the outline graph, wherein the interactive visual representation comprises an outline graph view and an analytics tool panel, wherein the outline graph view comprises a visual representation of a summarized view of the natural language text based on the outline graph and wherein the analytics tool panel provides controls for interacting with the outline graph view;

the creating comprising simplifying the outline graph by reducing the outline graph by weighting the nodes within the outline graph based upon a relative importance of the node with respect to other nodes and removing nodes having a weight below a predetermined value.

19. A method comprising:

utilizing at least one processor to execute computer code that performs the steps of:

receiving natural language text;

performing semantic parsing on the received natural language text to form, based on an input schema, a data forest comprising a directed graph comprising a plurality of nodes, each of the plurality of nodes being associated with (i) an identifier, (ii) a label, (iii) a value, (iv) a set of attributes, and (v) a mapping from attributes to values;

converting the directed graph to an outline graph comprising core nodes and layer nodes, wherein the converting comprises (i) grouping nodes of the data forest having the same label and assigning a set of identifiers to the grouped nodes and (ii) mapping each attribute to a multiset of values for nodes of the data forest having the same attribute;

contracting the outline graph via combining two or more nodes sharing at least one similar characteristic;

creating, for display on a user interface, an interactive visual representation of the outline graph, wherein the interactive visual representation comprises an outline graph view and an analytics tool panel;

wherein the interactive visual representation affords development of an information extractor and comprises a stylized view of the outline graph comprising a visual representation of a summarized view of the natural language text based on the outline graph;

said creating comprising permitting one or more user-initiated operations, using the analytics tool panel, with respect to the interactive visual representation, and propagating the one or more user-initiated operations back to the directed graph, wherein the creating comprises simplifying the outline graph by reducing the outline graph by weighting the nodes within the outline graph based upon a relative importance of the node with respect to other nodes and removing nodes having a weight below a predetermined value; and automatically generating an extraction program based on the outline graph.

* * * * *